United States Patent [19]

Ackeret

[11] Patent Number: 4,899,475
[45] Date of Patent: Feb. 13, 1990

[54] CONTAINER FOR A PILE OF SHEETS

[75] Inventor: Peter Ackeret, Kusnacht, Switzerland

[73] Assignee: Licinvest AG, Chur, Switzerland

[21] Appl. No.: 216,414

[22] Filed: Jul. 7, 1988

Related U.S. Application Data

[63] Continuation of Ser. No. 900,149, Jul. 11, 1986.

[30] Foreign Application Priority Data

Nov. 13, 1984 [DE] Fed. Rep. of Germany ....... 3441464

[51] Int. Cl.$^4$ ............................................. G09F 11/30
[52] U.S. Cl. ...................................... 40/513; 40/490; 40/511
[58] Field of Search ................. 40/511, 513, 490, 488, 40/489, 642

[56] References Cited

U.S. PATENT DOCUMENTS

| | | | |
|---|---|---|---|
| 3,377,727 | 4/1968 | Weggeland | 40/511 |
| 3,495,345 | 2/1970 | Weggeland | 40/490 |
| 3,783,540 | 1/1974 | Barclay | 40/511 |
| 4,057,920 | 11/1977 | Weggeland | 40/513 |
| 4,238,899 | 12/1980 | Ackeret | 40/513 |
| 4,241,528 | 12/1980 | Ackeret | 40/513 |
| 4,242,820 | 1/1981 | Ackeret | 40/513 |
| 4,245,417 | 1/1981 | Ackeret | 40/511 |
| 4,259,802 | 4/1981 | Ackeret | 40/513 |
| 4,550,516 | 11/1985 | Ackeret | 40/513 |

FOREIGN PATENT DOCUMENTS

| | | |
|---|---|---|
| 2833410 | 2/1980 | Fed. Rep. of Germany . |
| 3342238 | 6/1984 | Fed. Rep. of Germany . |
| 2403574 | 4/1979 | France . |

*Primary Examiner*—Kenneth J. Dorner
*Assistant Examiner*—J. Hakomaki
*Attorney, Agent, or Firm*—Robert R. Jackson

[57] ABSTRACT

The invention relates to a container for a pile of sheets essentially of like format with a housing (12), which has a viewing window (35) exposing to view the uppermost sheet in the pile, and with a slider member (14), which can be pulled out of the housing parallel to the plane of the window, having a front wall (61) essentially flush with one edge of the housing, which wall is joined by side-pieces (44) to a slider member rear wall (20), as well as a grip arrangement (56, 57) that fits-in in the direction of the window (35) from the front wall (61) and comprises a grip top plate or wall part (56) and a grip bottom plate or wall part (57), the outer faces of which are essentially flush with the surrounding outer faces of the housing, and having at least one housing part (627) that extends parallel to the or one of the grip plates and, when the slider member (14) is in the pushed-in state, is covered by this grip plate (57).

13 Claims, 3 Drawing Sheets

CONTAINER FOR A PILE OF SHEETS

This is a continuation of application Ser. No. 900,149, filed July 11, 1986, entitled "Container for a Pile of Sheets".

The invention relates to a container for a pile of sheets essentially of like format. A container of this type, designed as a sheet changer, is disclosed in US-PS 4376348. The known container comprises a housing with a viewing window from which a slider member carrying the pile of sheets can be pulled out and pushed back in again in a direction parallel to the plane of the viewing window. Each time the slider member is moved back and forth a sheet is removed from one end of the pile and put back at the other end of the pile, so that by the relative movements of the housing and slider member the pile is cyclically rearranged. For aesthetic reasons and also in order to be able to use the container as a stand-up or hanging frame, the outline of the container is, apart from rounded-off parts, intended to be essentially of a closed-rectangular shape. On the other hand, the user must be able to grasp the slider member. Therefore, the known container has moulded onto the slider member a grip part which fits-in inwards towards the viewing window from a slider member front end which is flush with one edge of the housing. The grip part has at the top and at the bottom a grip plate or wall, the outer faces of which are flush with the surrounding housing faces, and these housing faces have cut-outs or recesses complementary with the grip plates. From the front wall of the slider member side-pieces extend into the container which are joined to each other by an inner transverse wall, designed in the case mentioned as a separator bar. The pile of sheets, of which the front edge bears against the grip part and is supported by the bottom grip plate, rests on these side pieces. When the slider member is in the fully withdrawn position, the transverse edge of the pile facing the housing is supported only laterally by the side-pieces of the slider member.

With sheets that are particularly bowed, especially with photographic prints, when the slider member is pushed in the centre of the lower sheets in the pile may therefore strike the extreme edge of the grip plate recess, as a result of which the sheets are damaged, and this applies similarly to the upper end of the pile in the case of bowing in the opposite direction. At the upper end of the pile there is, of course, less risk, because the top grip plate is much narrower than the bottom one and consequently also the sheets are checked over a greater width by the surrounding housing top faces. This problem could be solved by simply extending the housing and slider member in the withdrawal direction, but this results in a large unwieldy container and also in the use of more material, which is undesirable in mass-produced articles of this type made of injection-moulded plastics.

In accordance with the invention, therefore, another solution to this problem is provided by a container for a pile of sheets, essentially of like format, with a housing which has a viewing window exposing to view the uppermost sheet in the pile, and with a slider member, which can be pulled out of the housing parallel to the plane of the window, having a front wall essentially flush with one edge of the housing, which wall is joined by side-pieces to a slider member rear wall, as well as a grip arrangement that fits-in in the direction of the window from the front wall and comprises a grip top plate or wall and a grip bottom plate or wall, the outer faces of which are essentially flush with the surrounding outer faces of the housing, and having at least one housing part that extends parallel to one of the grip plates and, when the slider member is in the pushed-in state, is covered by this grip plate.

The invention is described in detail in the following reference to the accompanying drawings.

Figure 1:
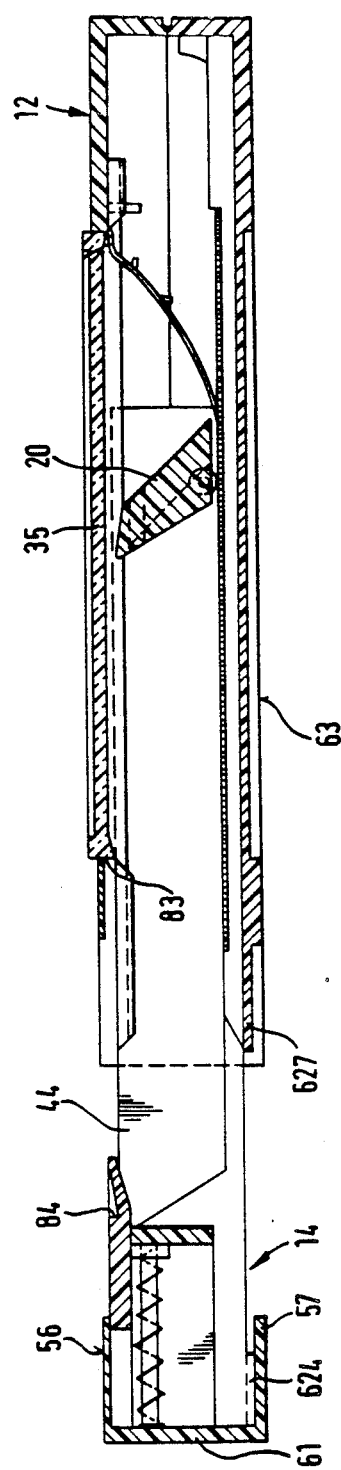
FIG. 1 is a longitudinal section of a first embodiment

In the drawings, details are also shown that are not developed within the scope of the present invention and are therefore not explained; insofar as the complete design and operation of the sheet changer are of interest (the examples of execution are sheet changers), reference can be made to the prior art mentioned at the beginning.

Figure 2:
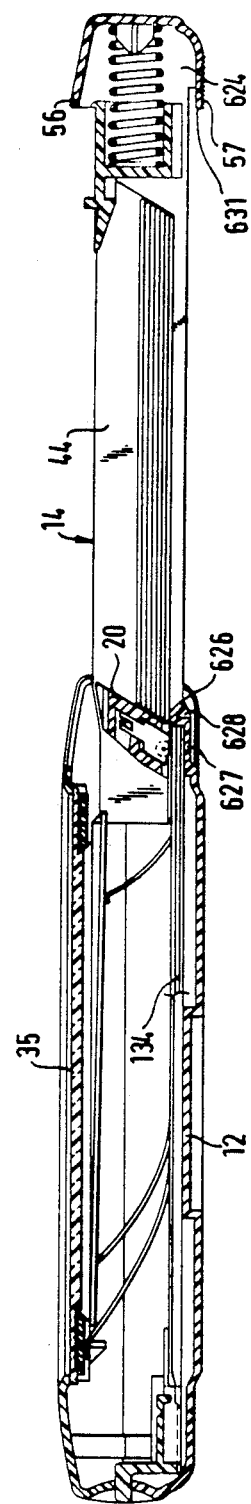
FIG. 2 is an analogous representation of a second embodiment
Figure 3:
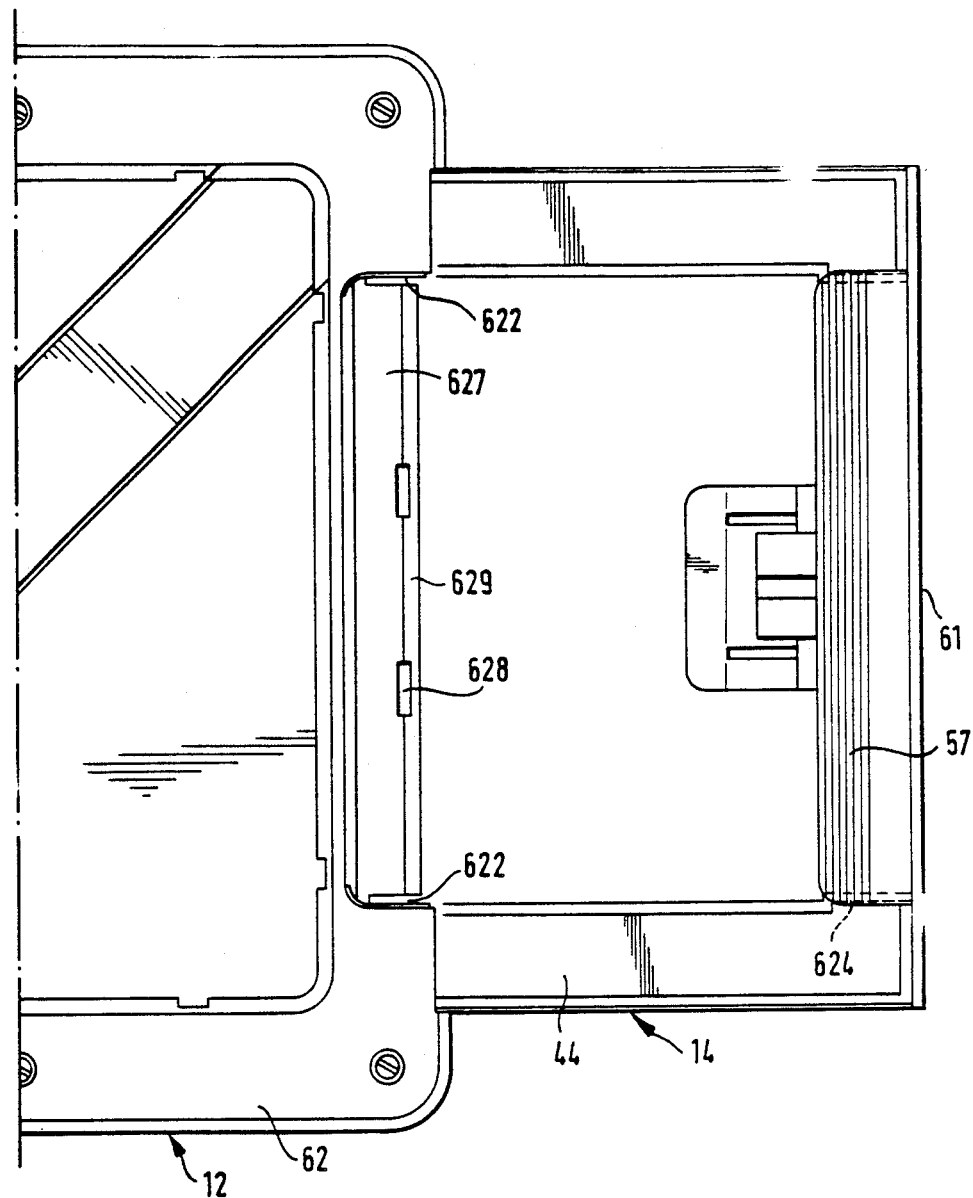
FIG. 3 is a view from below of the second embodiment with the slider member only partially withdrawn.

FIG. 1 shows the housing 12 with viewing window 35 from which the slider member 14 has been partially withdrawn. The slider member consists of a front wall 61, side-pieces 44 joined to this, an inner transverse wall in the form of a separator bar 20, and also a grip arrangement comprising the top grip plate or wall part 56 and a bottom grip plate or wall part 57, which arrangement is joined by a connecting ribs or webs 624 to the side-pieces. When the slider member is pushed in the bottom grip plate positions itself below an extension plate 627 running parallel to it, of the base 63 of the housing, the outer faces of the grip plates being essentially flush with the surrounding outer faces of the housing.

Where the same reference numerals are used in FIGS. 2 and 3 as in FIG. 1, they denote corresponding components in this embodiment. In addition, it can also be seen in FIG. 2 that the opposing transverse edges of the housing part 627 on the one hand, and the bottom grip plate 57 on the other, each have sloped parts 631 complementary with one another, so that these edges are prevented from striking each other hard when the slider member is pushed in if, for example, the parts were to be even only slightly deformed as a result of temperature variations. On the side remote from the grip plate 57 the housing part carries guide elements 626 of which the lower hollow chamber 628 can be seen also in FIG. 3, these guide elements being provided in the direction of insertion of the slider member in front of projecting rails arranged in the housing 12, so that they guide the pile of sheets onto these rails and prevent the lower sheets in the pile striking the front end of the rails 134.

Although the development according to the invention has been explained in the examples of execution only for the bottom grip plate 57, similar considerations apply also to the upper grip plate. For example, in FIG. 1 it can be seen that there is still a portion of the housing top wall lying above a slidable catch, movably mounted under the grip plate 56, after insertion into the housing 12 and meeting the edge 83, the function of which portion of top wall is comparable with the housing portion 627, since this feature, too, is provided for the purpose of making the container shorter.

I claim:

1. A container for a stack of substantially rectangular sheets, including:
   a housing;
   a slider received in said housing in an inner end position and adapted to be withdrawn out of said housing in a predetermined withdrawal direction so as to convey sheets into an outer sheet removal position; and
   a grip on said slider extending rearwards with respect to said withdrawal direction and, with said slider in its inner end position, into a housing wall recess, wherein a support element extends into said recess in order to supportingly engage beneath adjacent ends of sheets when said slider is in said outer position and prevent any edge of said recess from contacting said adjacent ends of sheets when said slider is moved from said outer position to said inner end position.

2. The container of claim 1 wherein said housing has a display window, a bottom opposite said window, and an opening through which said slider may be withdrawn, said slider having a front wall substantially coextensive with said housing opening when said slider is in its inner end position, said grip including an upper grip plate adjacent said housing window and a lower grip plate adjacent said housing bottom which both extend rearwards and define a cavity, and said support element extending into said cavity when said slider is in its inner end position.

3. The container of claim 2 wherein said slider front wall is substantially flush with housing portions surrounding said housing opening when said slider is in its inner end position.

4. The container of claim 2 wherein said slider front wall is joined via struts extending in said withdrawal direction to an inner slider end wall.

5. The container off claim 1 including means for cyclically rearranging a stack of sheets received in be container.

6. The container of claim 5 wherein said slider has an inner end wall which retains said stack.

7. The container of claim 6 wherein said slider end wall extends across said support element when said slider is in its outer position.

8. The container of claim 2 wherein at least one of said upper and lower grip plates is substantially flush with surrounding housing portions when said slider is in its inner end position.

9. The container of claim 4 wherein one of said grip plates is joined to said struts via ribs, and said support element being separated from surrounding housing wall portions by slots into which said ribs extend when said slider is in its inner end position.

10. The container of claim 9 wherein said slider struts having supporting surfaces for sheets, said surfaces being substantially flush with a surface of said support element.

11. The container of claim 2 wherein said lower grip plate is in surface contact with said support element when said slider is in its inner end position, and said lower grip plate and said support element having complementarily bevelled edges facing each other when said slider is in its outer position.

12. The container of claim 1 wherein said support element is an extension of said housing bottom.

13. The container of claim 1 wherein said support element is provided with guiding elements for slider supported sheets.

* * * * *